(12) United States Patent
Jensen (10) Patent No.: US 8,548,114 B2
(45) Date of Patent: Oct. 1, 2013

(54) METHOD AND APPARATUS FOR REPAIRING A JET PUMP LINE SUPPORT

(75) Inventor: Grant C. Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 975 days.

(21) Appl. No.: 11/755,613

(22) Filed: May 30, 2007

(65) Prior Publication Data

US 2008/0296470 A1 Dec. 4, 2008

(51) Int. Cl.
*G21C 15/25* (2006.01)
*F15C 3/10* (2006.01)
*G21C 15/00* (2006.01)

(52) U.S. Cl.
USPC ........... 376/372; 376/347; 376/361; 376/366; 376/370; 376/383; 376/391; 376/392; 376/402; 376/407; 376/463; 248/49; 248/65; 248/68.1

(58) Field of Classification Search
USPC ................. 376/392, 372, 407, 347, 361, 366, 376/370, 383, 391, 402, 463; 248/49, 65, 248/68.1, 69, 72–74.5
See application file for complete search history.

(56) References Cited

U.S. PATENT DOCUMENTS

| | | | | |
|---|---|---|---|---|
| 2,354,919 A * | 8/1944 | Lockwood | ................... | 248/68.1 |
| 3,551,876 A * | 12/1970 | Walter | ......................... | 439/110 |
| 3,836,941 A * | 9/1974 | Izraeli | ............................ | 439/431 |
| 4,185,802 A * | 1/1980 | Myles et al. | .................. | 248/74.4 |
| 5,021,014 A * | 6/1991 | Walter et al. | .................. | 439/798 |
| 5,516,063 A * | 5/1996 | Buckshaw et al. | ............ | 248/68.1 |
| 5,752,807 A * | 5/1998 | Erbes | .............................. | 417/63 |
| 6,435,839 B1 * | 8/2002 | Erbes | ............................... | 417/63 |
| 6,783,101 B2 * | 8/2004 | Knotts | ......................... | 248/68.1 |

* cited by examiner

*Primary Examiner* — Bernarr Gregory
(74) *Attorney, Agent, or Firm* — Harness, Dickey & Pierce, P.L.C.

(57) ABSTRACT

A jet pump sensing line support clamp may be used for sensing line repair, replacement, and damage prevention or reduction. The clamp may affix to jet pump sensing line supports and confine the individual jet pump sensing lines. The clamp may provide for further access or securing of the lines in the support through the clamp. Methods of installing the clamp may include attaching and tightening the clamp against the sensing lines.

24 Claims, 6 Drawing Sheets

PRIOR ART

METHOD AND APPARATUS FOR REPAIRING A JET PUMP LINE SUPPORT

BACKGROUND

1. Field

Example embodiments generally relate to jet pump sensing line support clamp assemblies usable in nuclear reactors for jet pump sensing line component repair and replacement. Additionally, example embodiments relate to method of using jet pump sensing line repair apparatuses in a Boiling Water Reactor (BWR).

2. Description of Related Art

Generally, BWRs include jet pumps as part of a recirculation system to effectively move coolant and moderator through a nuclear core. In order to evaluate operating conditions within the nuclear core, it may be desirable to monitor the flow rate through the core, including flow rate of coolant from the jet pumps. Typically, a jet pump sensing line is used to measure flow rate from the jet pumps by measuring a pressure differential between the inlet and nozzle of the jet pumps.

Figure 1:
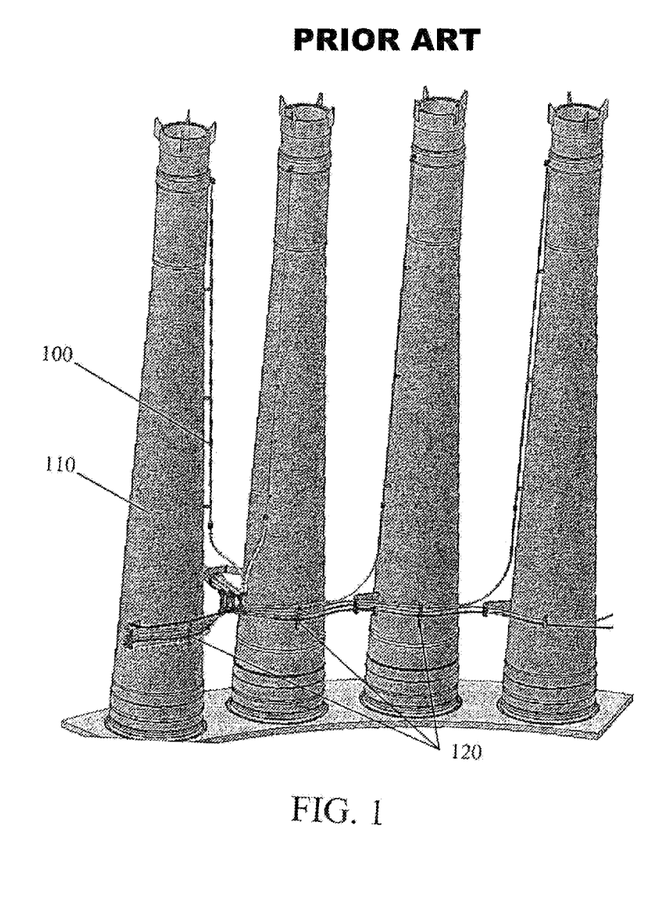
FIG. 1 is an illustration of related art BWR jet pump nozzles with jet pump sensing lines coupled to a diffuser shell by jet pump sensing line supports.
Figure 2:
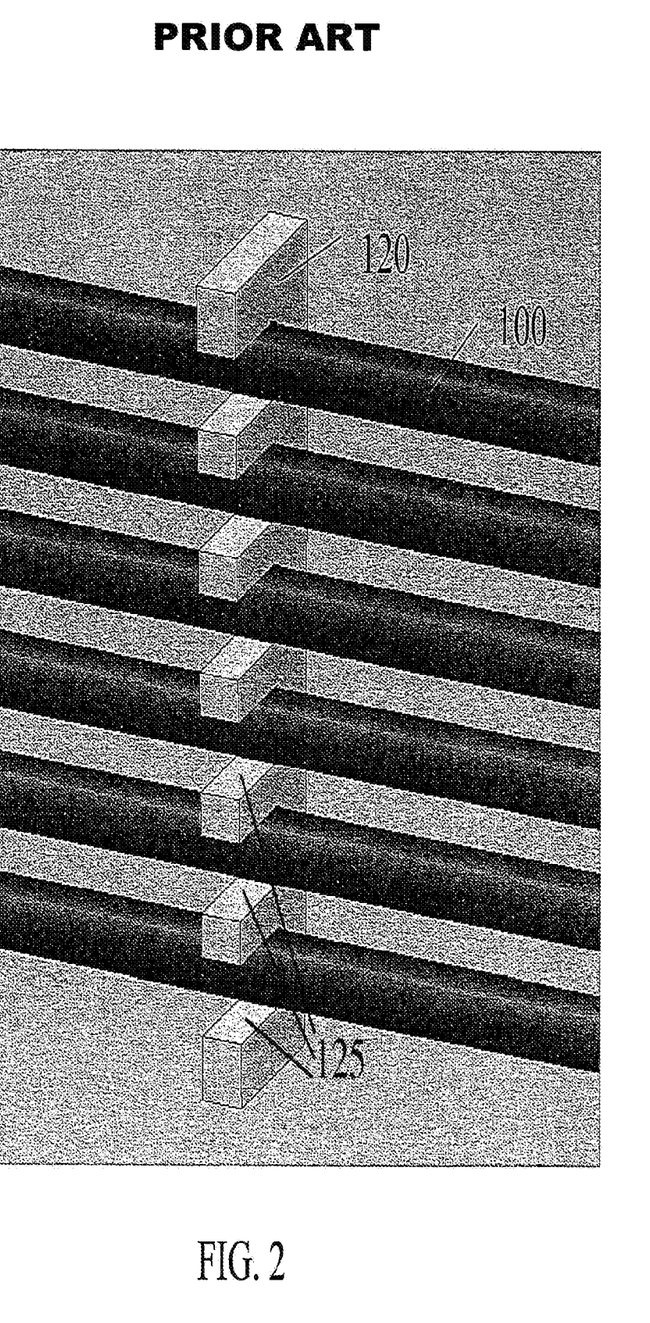
FIG. 2 is closer view of the jet pump sensing lines and support shown in FIG. 1.

FIGS. 1 and 2 are illustrations of a related art jet pump sensing lines 100 coupled to a lower diffuser shell 110 at the base of the jet pumps by a sensing line support 120 welded to both the diffuser shell 110 and the jet pump sensing lines 100. The sensing lines 100 are typically welded to the support 120 in support grooves 125, and, as such, are subject to flow-induced vibration in the jet pump.

The jet pump sensing lines 100 shown in FIGS. 1 and 2 are typically installed within a BWR core and are accessible only during scheduled plant outages for refueling and repair. These outages occur at several month intervals, and thus components within the core, including the jet pumps and jet pump sensing lines 100, must operate for lengthy periods before they can be inspected or repaired.

Further, BWR core operating conditions include high levels of radioactivity due to fission occurring in the fuel rods. Radioactivity, particularly neutron flux commonly encountered in operating nuclear cores, degrades many materials' strength and elasticity over time. Components within the core, including jet pump sensing lines 100 and sensing line supports 120, are subject to premature brittling and cracking due to radiation exposure.

The combination of flow-induced vibration, lengthy operating cycles, and radiation degrading may cause jet pump sensing line welds to fail, allowing the jet pump sensing lines 100 to become unseated from their support 120 and become damaged and/or damage other core components. Related art repair means typically include re-welding broken supports during plant outages.

SUMMARY

Example embodiments are directed to a clamp for use as a BWR jet pump sensing line support clamp or a repair method of the jet pump sensing line. The clamp includes a housing that secures the jet pump sensing lines within the jet pump sensing line support through a non-welded clamping action. The housing may have holes to accommodate a pad that seats against the individual sensing lines. The pads may be installed and tightened with a jack screw and associated ratchet lock spring to permit specific degrees of seating against the jet pump sensing lines.

BRIEF DESCRIPTIONS OF THE DRAWINGS

The present invention will become more apparent by describing, in detail, example embodiments thereof with reference to the attached drawings, wherein like elements are represented by like reference numerals, which are given by way of illustration only and thus do not limit example embodiments herein.

DETAILED DESCRIPTION

Figure 3:
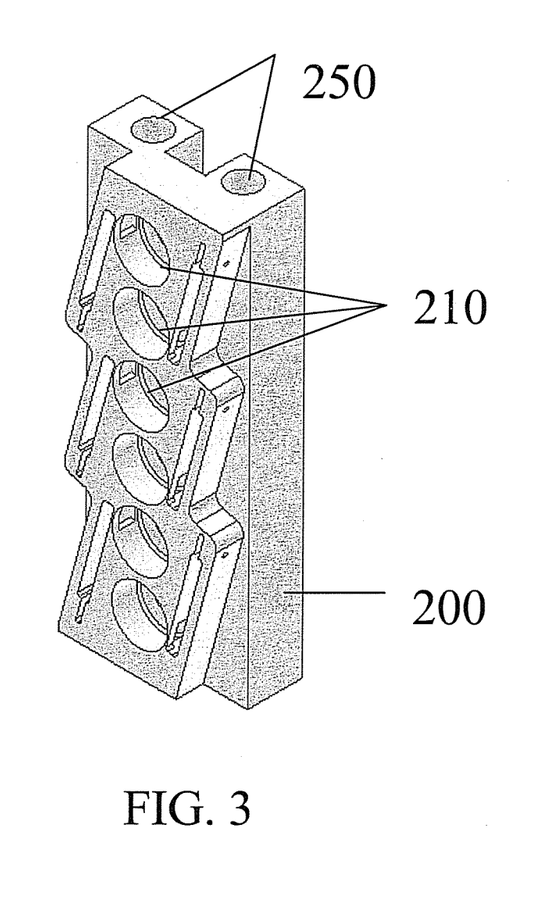
FIG. 3 is an isometric view of a housing that may be used in a jet pump sensing line clamp.
Figure 7:
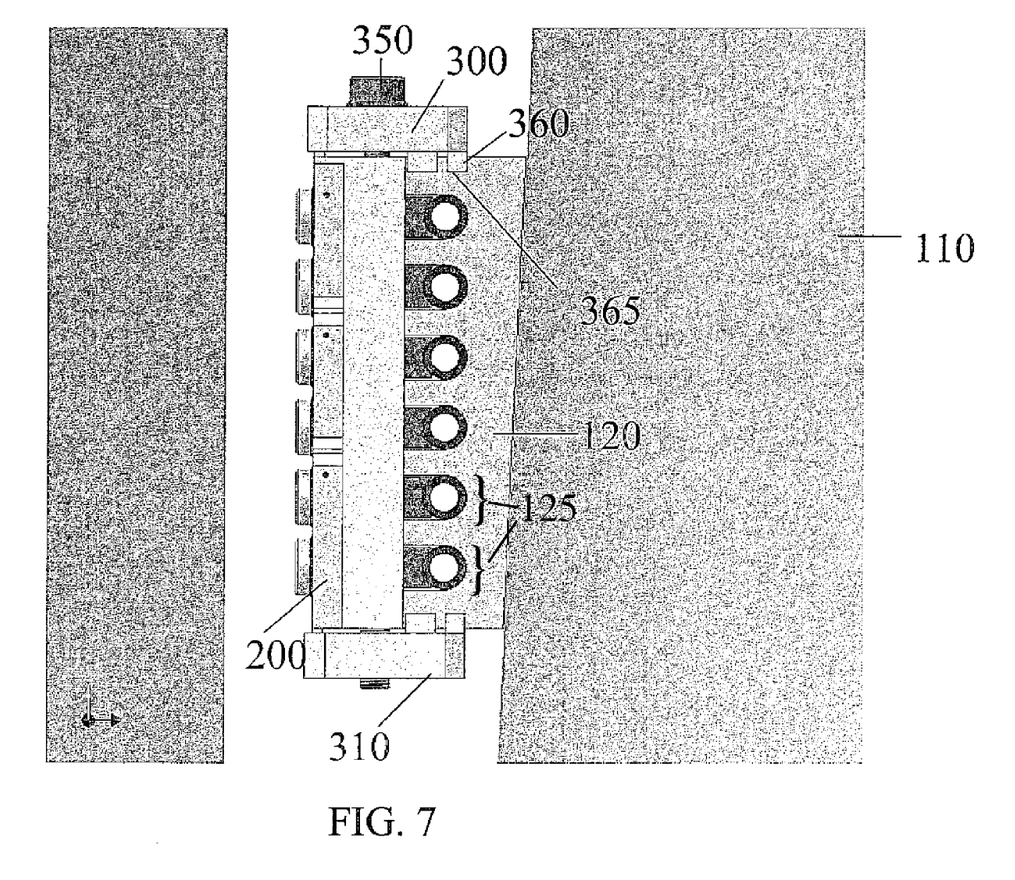
FIG. 7 is a profile view of an installed support clamp showing the upper and lower plates and bolt used to clamp to the EDM slot of the support.

FIG. 3 is an isometric view of a housing 200 used in a jet pump sensing line support clamp in accordance with an example embodiment. As shown in FIG. 7, the housing 200 is clamped to the jet pump sensing line support 120 in order to prevent jet pump sensing lines 100 from becoming unseated or otherwise damaged during operation of a BWR.

The housing 200 of may be clamped to the sensing line support 120 without welding by several methods of attachment. For example, as shown in FIG. 7, an upper plate 300 and a lower plate 310 may be attached to both the housing 200 and the sensing line support 120 to clamp the housing 200 onto the sensing line support 120 and provide the securing and confining to the jet pump sensing lines 100 in support grooves 125. A bolt 350 may attach each of the upper plate 300, housing 200, and lower plate 310 through a clearance hole 250 in the housing (shown in FIG. 3). Alternatively, several bolts 350 may be used with multiple clearance holes 250 to provide the desired clamping with the sensing line support 120. As a further example, bolts 350 may have a ratcheting edge that interacts with ratchet lock springs (not shown) in the upper plate 300 to provide incremental tightening of the bolts 350. Alternatively, the housing 200 may be secured in a notch in the upper plate 300 and lower plate 310 to prevent radial displacement or uneven contact between the support clamp components.

Each component of example jet pump sensing line support clamp is fabricated from materials that will substantially maintain their physical properties in a nuclear reactor environment. For example, the housing 200, upper and lower plates 300 and 310, and bolts 350 may be fabricated from an austenitic stainless steel and/or similar material. It may be desirable to vary the materials used for components to reduce corrosion and/or galling. For example, the housing 200 and upper and lower plates 300 and 310 may be fabricated from Type 316 austenitic stainless steel, whereas bolts 350 may be fabricated from Type XM-19 stainless steel to prevent galling with the Type 316 stainless steel.

As shown in FIG. 7, at least one groove 360 may be machined, for example, by electric discharge machining, or otherwise made into the top or bottom of the sensing line support 120, and either upper or lower plate 300 and 310 may have at least one tongue 365 that is configured to mate with the groove 360. When the plates 300 and 310 are secured to the housing 200 and support 120, the tongue 365 and groove 360 may provide further securing and alignment of the housing 200 and support 120.

As shown in FIG. 3, the housing 200 may have a series of access holes 210 that align with individual jet pump sensing lines, transverse from and not overlapping any bore hole 250. The access holes 210 may be of any size and may permit access through the housing 200 to the sensing lines 100 in the support 120 without allowing the sensing lines 100 to pass through the housing 200 and become unseated.

Figures 4, 5, 6:
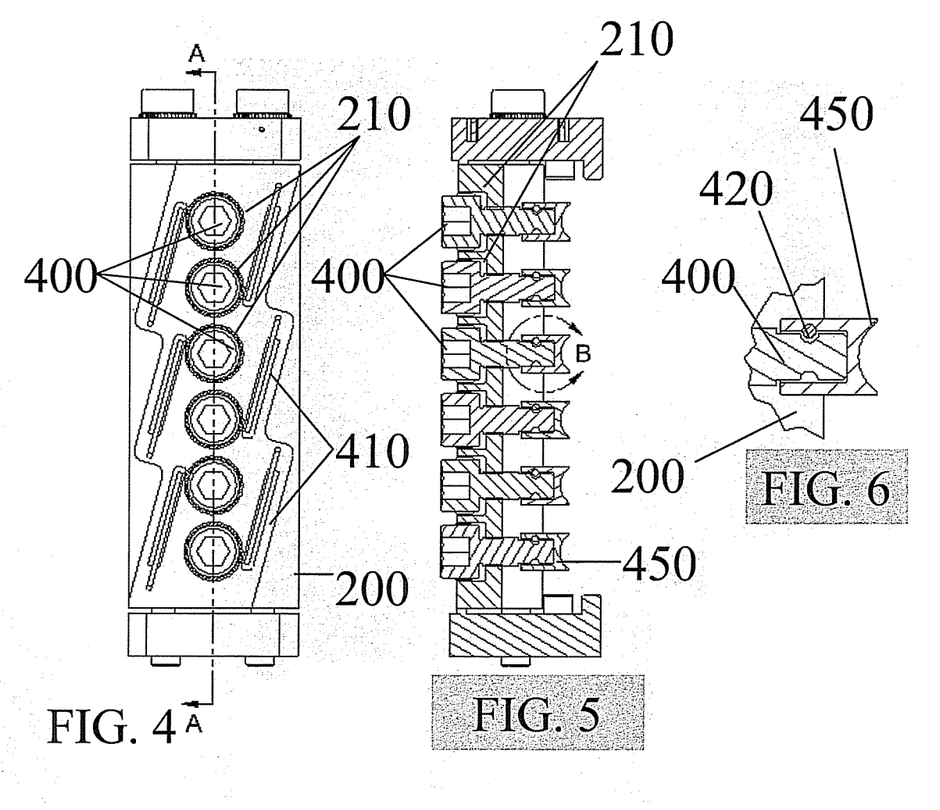
FIG. 4 is a profile view of an installed jet pump sensing line support clamp with jack screws.
FIG. 5 is a profile cutaway view of the line A-A of FIG. 4 showing the jack screws seating the pads installed in the clamp.
FIG. 6 is a detail of section B of FIG. 5 showing the jack screw and pad secured by a dowel pin within the housing.

As shown in FIGS. 4-6, access holes 210 may permit other components to pass through the housing 200 and interact with the sensing lines 100. For example, jack screws 400 may pass through the access holes 210 and mate with pads 450. The pads 450 may be seated against the individual jet pump sensing lines 100 by a dowel pin 420 in order to further secure the lines 100 in the support 120, dampen vibration in the lines 100, and prevent or reduce other damage to the lines 100. The pads 450 may be secured in the access holes 210 in several different ways, and the use of jack screws 400 is disclosed only as an example of one such way.

Pads 450 may be tightened to a desired force against the sensing lines 100 using a variety of fastening and tightening devices. For example, FIGS. 4-6 show a jack screw-ratchet lock spring configuration to allow incremental tightening of the pads 450 against the lines 100. A series of ratchet lock springs 410 may be placed in grooves in the housing 200 in order to provide a ratcheting securing of the jack screws 400 or otherwise inserted into the housing 200 to interact with the jack screws 400. In this example, the jack screws 400 may be incrementally tightened as their serrated edges pass over and lock against the corresponding ratchet lock spring edge.

Pads 450 may be tightened against the sensing lines 100 in a variety of ways and not necessarily by a ratcheting device. For example, no access holes 210 may be provided, and pads 450 may instead be fastened directly to the housing 200 so as to secure the sensing lines 100 as the housing is clamped to the support 120. Further, any number of access holes 210 and corresponding components may be included in example embodiments, depending on the number of sensing lines to be secured, the amount of room available, or any other engineering consideration.

Each tightening component that is present in an example embodiment is fabricated from a material designed to maintain its physical characteristics in an operating nuclear reactor. For example, jack screws 400 and pads 450 may be fabricated from austenitic stainless steel. As a further example, in order to prevent corrosion, jack screws 400 and pads 450 may be fabricated from different types of austenitic stainless steel, for example, Type XM-19 for the jack screws 400 and Type 316 for pads 450. Ratchet lock springs may be fabricated from a different material, for example, Inconel X-750, a nickel-chromium-iron alloy.

The specific materials described for components of a jet pump sensing line support clamp are mere examples. Any material may be used depending on core chemistry and sensing line condition, so long as the material will substantially maintain its physical characteristics in an operating nuclear reactor environment over an operating cycle.

Example methods of securing a jet pump sensing line to a support may include attaching a support clamp assembly to a jet pump sensing line support and tightening the support clamp assembly. Structural components described above with regard to example jet pump sensing line support clamps are useable with example methods of securing a jet pump sensing line to a support.

Figure 8:
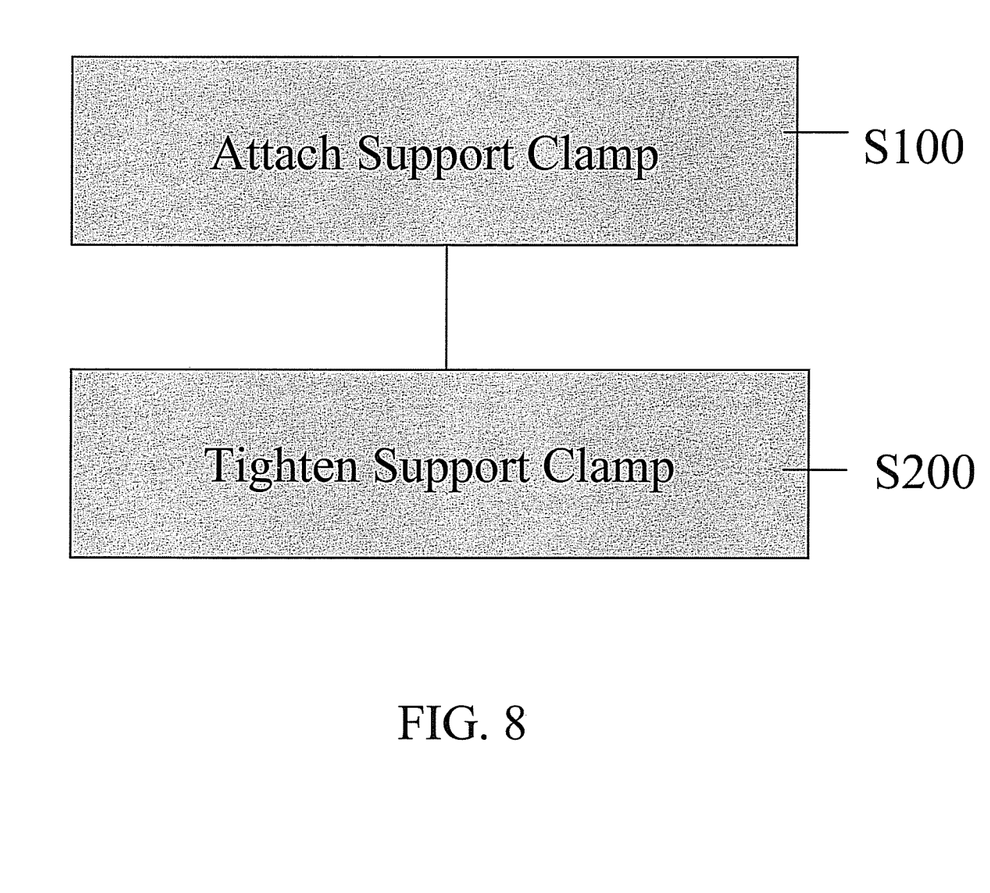
FIG. 8 is a flow chart of an example method of repairing a jet pump sensing line support.

For example, as shown in FIG. 8, a support clamp may be attached to a jet pump sensing line support in step S100. This may include affixing an upper and lower plate onto both a housing and jet pump support line so as to confine the jet pump sensing lines into particular grooves blocked by the housing. Step S100 may further include machining appropriate tongue and grooves into jet pump sensing line supports in order to further mate and align the housing and jet pump sensing line support.

In step S200, the support clamp may then be tightened against the jet pump sensing lines in order to provide further seating, protection, and/or vibration damping. For example, tightening may include ratcheting a jack screw and ratchet lock spring in a hole in the housing so as to incrementally tighten a pad attached to the jack screw against the jet pump sensing line in the support.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the spirit and scope of the following claims.

What is claimed is:

1. A support clamp assembly, comprising:
 a housing with a longitudinal main body attachable to a plurality of fingers of a sensing line support without welding, the fingers extending horizontally and being located in a vertical row,
 a longitudinal rear surface of the main body configured to contact a distal end of each of the plurality of fingers to confine jet pump sensing lines in support grooves between the fingers,
 at least one access hole defined by the housing, each access hole having an opening in the rear surface of the main body and a front surface of the housing, each hole configured to be located in front of a corresponding support groove when the support clamp assembly is attached to the sensing line support, an axial centerline of each access hole being about collinear with an axial centerline of a corresponding support groove.

2. The support clamp assembly of claim 1, wherein the at least one access hole is a plurality of access holes in a row, the row positioned lengthwise along the housing.

3. The support clamp assembly of claim 2, further comprising:
 at least one clearance hole running lengthwise through the housing, the clearance hole penetrating a top surface and a bottom surface of the housing.

4. The support clamp assembly of claim 3, further comprising:
 an upper plate affixed to the top surface of the clamp assembly,
 a lower plate affixed to the bottom surface of the clamp assembly,
 a bolt running through the at least one clearance hole and securing the upper and lower plates to the clamp assembly, each clearance hole having one bolt,
 the upper and lower plates attachable to the sensing line support through a non-welding process.

5. The support clamp assembly of claim 4, wherein the upper and lower plates each include a tongue, each tongue matable with a notch on a distal end of one of the plurality of fingers of the sensing line support to stabilize the clamp assembly on the sensing line support.

6. The support clamp assembly of claim 4, wherein the housing is configured to attach to the plurality of fingers such that the longitudinal rear surface of the main body of the housing is positioned about perpendicular to a top and bottom surface of each horizontally extending finger.

7. The support clamp assembly of claim 1, further comprising:
a pad, configured to pass through the at least one access hole and into the corresponding support groove to dampen vibration of a corresponding sensing line within the support groove.

8. The support clamp assembly of claim 7, wherein the pad has a arced rear surface matable with an outer side surface of the corresponding sensing line.

9. The support clamp assembly of claim 8, wherein the pad has a recessed area on a front side of the pad.

10. The support clamp assembly of claim 9, further comprising:
a jack screw in at least one of the access holes, each jack screw having a distal end configured to fit within the recessed area of the pad, the jack screw configured to be tightened to ensure that the pad fits snugly against the sensing line.

11. The support clamp assembly of claim 10, further comprising:
a dowel pin on an inner surface of the recessed area of the pad,
the jack screw defining a divot on a side surface of the jack screw near the distal end of the jack screw, the divot matable with the dowel pin to lock the jack screw and the pad in place within the corresponding support groove.

12. The support clamp assembly of claim 10, further comprising:
serrated edges on a circumferential surface of the jack screw,
a ratchet lock spring on the front surface of the housing, the ratchet lock spring engageable with the serrated edges of the jack screw to incrementally tighten the jack screw and provide anti-rotational support for the jack screw.

13. The support clamp assembly of claim 12, wherein the jack screw and the ratchet lock spring are made of a material configured to substantially maintain its physical properties in an operating nuclear reactor environment, wherein the jack screw and ratchet lock spring are made from a material that is different from a material of the housing, the jack screw and ratchet lock spring being made from Iconel X-750, a nickel-chromium-iron alloy.

14. The support clamp assembly of claim 1, wherein, the housing is made of a material configured to substantially maintain its physical properties in an operating nuclear reactor environment, the housing material being type 316 austenitic stainless steel.

15. The support clamp assembly of claim 1, further comprising:
opposing, vertically extending tongues attached to the main body of the housing, the tongues configured to insert into grooves on a side surface of the fingers to attach the housing to the fingers without welding,
wherein the longitudinal rear surface of the main body is about perpendicular to the horizontally extending fingers, the tongues extending about parallel to a longitudinal length of the main body.

16. A support clamp assembly, comprising:
a jet pump sensing line support configured to be affixed to a jet pump diffuser,
a plurality of horizontally extending fingers projecting from the jet pump sensing line support, the fingers located in a vertical row, each pair of fingers defining a support groove between the pair of fingers,
jet pump sensing lines configured to be located in each support groove,
a housing with a longitudinal rear surface attachable to a distal end of the plurality of fingers without welding,
a plurality of access holes in a row defined by the housing, the row of access holes positioned lengthwise along the housing, each hole located in front of a support groove, an axial centerline of each hole being about collinear with an axial centerline of a corresponding support groove.

17. The support clamp assembly of claim 16, further comprising:
a pad located in each support groove, each pad having an arced rear surface that mates with a corresponding sensing line.

18. The support clamp assembly of claim 17, wherein each the pad has a recessed area on a front side of the pad.

19. The support clamp assembly of claim 18, further comprising:
a jack screw in each of the access holes, each jack screw having a distal end fitting within the recessed area of a corresponding pad, the jack screw configured to be tightened to ensure that the corresponding pad fits snugly against the sensing line.

20. The support clamp assembly of claim 19, further comprising:
a dowel pin on an inner surface of the recessed area of each pad,
each jack screw defining a divot on a side surface of the jack screw near the distal end of the jack screw, the divot mating with the dowel pin to lock the jack screw and the pad in place within the corresponding support groove.

21. The support clamp assembly of claim 19, further comprising:
serrated edges on a circumferential surface of each of the jack screws,
a ratchet lock spring, for each jack screw, located on the front surface of the housing, each ratchet lock spring engaging the serrated edges of a corresponding jack screw to incrementally tighten the jack screw and provide anti-rotational support for the jack screw.

22. The support clamp assembly of claim 16, further comprising:
at least one clearance hole running lengthwise through the housing, the clearance hole penetrating a top surface and a bottom surface of the housing,
an upper plate affixed to the top surface of the clamp assembly,
a lower plate affixed to the bottom surface of the clamp assembly,
a bolt running through the at least one clearance hole and securing the upper and lower plates to the clamp assembly, each clearance hole having one bolt,
the upper and the lower plates attached to the fingers through a non-welding process.

23. The support clamp assembly of claim 22, wherein the upper and lower plates each include a tongue, each tongue mating with a notch on a distal end of one of the plurality of fingers of the sensing line support to stabilize the clamp assembly on the sensing line support.

24. The support clamp assembly of claim 16, further comprising:
- opposing, vertically extending tongues attached to the housing, the tongues configured to insert into grooves on a side surface of the fingers to attach the housing to the fingers without welding,
- wherein the longitudinal rear surface of the housing is about perpendicular to the horizontally extending fingers, the tongues extending about parallel to a longitudinal length of the housing.

* * * * *